(12) United States Patent
Wieduwilt

(10) Patent No.: US 9,399,332 B2
(45) Date of Patent: Jul. 26, 2016

(54) ULTRASONIC JOINING METHOD AND ULTRASONIC JOINING DEVICE

(71) Applicant: Robert Bosch GmbH, Stuttgart (DE)

(72) Inventor: Ulrich Wieduwilt, Schwaebisch Gmuend (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/561,411

(22) Filed: Dec. 5, 2014

(65) Prior Publication Data

US 2015/0165719 A1 Jun. 18, 2015

(30) Foreign Application Priority Data

Dec. 12, 2013 (DE) .......................... 10 2013 225 745

(51) Int. Cl.
*B32B 37/00* (2006.01)
*B31F 5/00* (2006.01)
*B29C 65/08* (2006.01)

(52) U.S. Cl.
CPC ................. *B31F 5/008* (2013.01); *B29C 65/08* (2013.01); *B29C 65/081* (2013.01)

(58) Field of Classification Search
CPC ....... B23F 5/008; B29C 65/08; B29C 65/081; B65B 51/225
USPC .................................. 156/73.1, 580.1, 580.2
See application file for complete search history.

(56) References Cited

U.S. PATENT DOCUMENTS

| | | | | |
|---|---|---|---|---|
| 7,220,331 B2 * | 5/2007 | Gmeiner | ............... | B29C 65/086 156/210 |
| 8,052,816 B2 * | 11/2011 | Klinstein | ................ | B29C 65/08 156/64 |
| 2013/0112332 A1 * | 5/2013 | Spicer | .................... | B23K 20/10 156/64 |

FOREIGN PATENT DOCUMENTS

EP 0340334 11/1989

* cited by examiner

*Primary Examiner* — James Sells
(74) *Attorney, Agent, or Firm* — Michael Best & Friedrich LLP

(57) ABSTRACT

An ultrasonic joining method for bonding paper material (5), in particular paper, paperboard or cardboard, comprising the following steps: introducing the paper material (5) into a gap (4) between an ultrasonic horn (2) and an anvil (3), applying a joining force in a joining force direction (6) to the paper material (5) in the gap (4), and setting the ultrasonic horn (2) into an ultrasonic vibration in order to join the paper material (5), characterized in that an ultrasonic frictional welding operation is carried out, in which the joining force direction (6) is not parallel to the direction of vibration (7) of the ultrasonic vibration.

14 Claims, 4 Drawing Sheets

Stand der Technik

ULTRASONIC JOINING METHOD AND ULTRASONIC JOINING DEVICE

BACKGROUND OF THE INVENTION

The present invention relates to an ultrasonic joining method and an ultrasonic joining device for bonding paper materials, in particular paper, paperboard or cardboard.

In the European patent Application EP 0 340 334 A2, a device is described which is suited for bonding two- or multilayered paper products by means of ultrasonic sound. The paper used is thereby provided with a thermoplastic coating. The longitudinal waves are generated by means of the ultrasonic horn, so that said ultrasonic horn is moved towards the anvil and moved again away from the anvil when ultrasonic vibrations occur. A sufficient compression of the paper layers is generated by the corresponding ultrasonic frequency and the corresponding contact pressure. At the same time, a high degree of heat development occurs in the micro-range of the thermoplastic coating and therefore for the adhesive bonding of the paper layers.

The attached FIG. 6 shows an ultrasonic joining device 100 according to the prior art for bonding thermoplastically coated paper material in a schematically simplified view. The device 100 comprises an ultrasonic horn 102 according to the prior art and an anvil 103 according to the prior art. The paper material 5 to be joined is located between the ultrasonic horn 102 and the anvil 103. A joining pressure 106 is applied to the paper material 5 in the gap between ultrasonic horn 102 and anvil 103. The ultrasonic horn 102 generates an ultrasonic vibration having a vibration direction 107. The vibration direction 107 and the direction of the joining force 106 are aligned parallel to one another in the device 100 according to the prior art. The longitudinal movement direction of the ultrasonic horn 102 is thus used for the joining process.

SUMMARY OF THE INVENTION

An ultrasonic frictional welding for bonding paper material takes place in the inventive ultrasonic joining method and the inventive ultrasonic joining device. The ultrasonic vibration generated by the ultrasonic horn has a specific vibration direction. A joining force is applied to the paper material in the gap between the ultrasonic horn and the opposing anvil at the same time that the ultrasonic vibration is produced. This joining force is oriented in a joining force direction. Provision is made according to the invention for the direction of vibration and the joining force direction not to be oriented parallel to one another. In the prior art, the direction of vibration of the ultrasonic horn is always configured parallel to the joining force direction. As a result, primarily the longitudinal direction of movement of the vibrating particles is used in the prior art for the energy generation in the joining seam. The thermal energy is thereby generated from intermolecular and interfacial friction of the joining partners. The thermal energy of the interfacial friction is thereby obtained from the deformation energy resulting from the deformation of the joining material by means of the anvil geometry. In contrast thereto, it was recognized within the scope of the invention that a very much better joining of paper materials is possible if a frictional welding method is used, in which the interfacial friction is primarily used. This is achieved by an inventive ultrasonic joining method for bonding paper material, in particular paper, paperboard or cardboard, comprising at least the following steps: (i) introducing the paper material into the gap between an ultrasonic horn and an anvil; (ii) applying a joining force to the paper material in the gap in a joining force direction; (iii) setting the ultrasonic horn into ultrasonic vibration for joining the paper material. According to the invention, provision is thereby made for ultrasonic frictional welding to be carried out which is defined by the fact that the joining force direction is not parallel to the direction of vibration of the ultrasonic vibration. In particular in the packaging industry, numerous types of adhesive bonds of cardboard packagings are used with the aid of dispersion adhesives (cold glue) and hotmelt adhesives (hot glue). In order to streamline the packaging process, i.e. to make said process cleaner and more hygienic, the ultrasonic welding method can be employed according to the present invention. Due to the short cycles in the range of 0.1 to 1 second and holding times of 0.1 to 2 seconds, the ultrasonic joining method is particularly suitable for use in serial production for large quantities. With respect to the adhesive bonding method, the ultrasonic joining method has the following advantages: According to the invention, no joining material is required; thus enabling hot or cold glue to be substituted. The paper material does not require any additional thermoplastic coating for the joining process by means of ultrasonic sound. Conventional bonding machines are very susceptible to contamination. Because no additives are preferably used in the method according to the invention, with the exception of the preferred use of water for moistening, contamination can be reduced and compliance to hygienic standards, which are of great importance to the food and pharmaceutical industry, can be achieved. This also means that there is no danger of a migration of joining material (glue) into the packaged good. In addition, a high degree of energy savings results because hot glue does not have to be continually heated. The energy necessary for the ultrasonic joining method is only required in the range of the joining time, i.e. in the millisecond range. The ultrasonic joining method according to the invention furthermore has various advantages with respect to conventional ultrasonic joining methods in which the joining direction is oriented parallel to the direction of vibration of the ultrasonic horn. Said advantages include: Materials having less sound attenuation can be used in the inventive method, which is particularly the case for paper materials. There is no noise emission as a result of the frictional movement of the joined paper materials like that which can be perceived from the hammering movements of the ultrasonic horn during longitudinal ultrasonic welding methods. The shear and peel strength of the joint is significantly higher in the method according to the invention than in joints which have been produced using conventional ultrasonic joining methods. A further decisive advantage of the inventive method is that the entire vibration and not only the amplitude which acts in the direction of the joint is used for the energy input into the paper material. As a result of a hammering movement on the paper material to be joined being avoided, the paper material is treated gently when carrying out the ultrasonic joining method according to the invention.

Provision is particularly made for the joining force direction to be perpendicular or at a right angle to the direction of vibration. Deviations of ±10° are still considered to be perpendicular in this case. As a result of this orientation, it can be ensured that the amplitudes of the vibrating ultrasonic horn act in both directions to the greatest possible extent on the paper material. At the same time, the perpendicular orientation of the joining force direction to the direction of vibration ensures an approximately exclusive use of the interfacial friction at the joints.

The ultrasonic vibration frequency of the ultrasonic horn is preferably at 10 to 80 kHz, particularly preferably between 20 and 70 kHz. Provision is furthermore preferably made for the ultrasonic vibration amplitude of the ultrasonic horn to preferably lie between 10 and 50 µm, especially preferably between 20 and 40 µm. An interfacial friction that is favorable to the joining of the paper material at the joints occurs especially with these parameters for the ultrasonic vibration.

Provision is furthermore preferably made for the paper material, preferably on the inside surfaces of the joints, to be moistened prior to and/or during the ultrasonic frictional welding. The moistening preferably takes place using liquid water and/or steam and/or a moistening means or something similar.

It is assumed that the paper structure will be lightly damaged at the joints due to the ultrasonic frictional welding and that a local pulp thus forms. This pulp facilitates a fiber mingling and therefore a type of gluing of the paper fibers, analogous to paper production, as a result of the effect of the ultrasonic sound and the pressure by means of the joining force. A type of compression of the joining surface leads to the formation of hydrogen bonds. This process is also often described as fiber mingling. The local formation of hydrogen bonds can be actively supported by the moistening of the inside surfaces of the joints.

The inventive application of the ultrasonic frictional welding to paper material leads to very stable joints so that preferably the use of adhesives or thermoplastic coatings can be avoided. It is furthermore not necessary for printing ink to be situated on the paper material at the joints which would promote a bonding of the paper materials in a fashion similar to a thermoplastic coating.

The invention further comprises a method for producing a packaging from paper material, in particular paper, paperboard or cardboard. In this method for producing the packaging, the ultrasonic joining method, as it has just been described, is used.

The invention further comprises an ultrasonic joining device for bonding paper material, in particular paper, paperboard or cardboard. The ultrasonic joining device comprises an ultrasonic horn that can be set into ultrasonic vibration and an opposing anvil. The paper material to be bonded is inserted in the gap between the ultrasonic horn and the anvil and is subjected to a joining force. The joining force is generated by applying a corresponding force to the ultrasonic horn and/or the anvil. The joining force acts thereby in a joining force direction. Provision is made according to the invention for the ultrasonic joining device to be designed to carry out an ultrasonic frictional welding. In this ultrasonic frictional welding process, the joining force direction is not oriented parallel to the direction of vibration of the ultrasonic vibration.

Provision is especially made according to the invention for the ultrasonic horn to be able to move in the direction of the anvil and/or for the anvil to be able to move in the direction of the ultrasonic horn. The joining force can thus be generated by means of this process.

BRIEF DESCRIPTION OF THE DRAWINGS

Two exemplary embodiments of the invention are subsequently described in detail with reference to the accompanying drawings. In the drawings.

DETAILED DESCRIPTION

Figure 1:
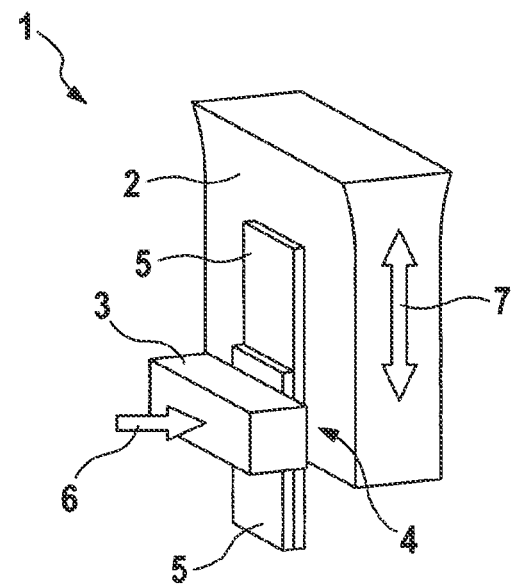
FIG. 1 shows a schematically simplified depiction of an ultrasonic joining device according to the invention for carrying out the inventive ultrasonic joining method according to a first exemplary embodiment.

FIG. 1 shows in a very schematically simplified view an ultrasonic joining device 1 according to the first exemplary embodiment. The inventive ultrasonic joining method can be carried out with this ultrasonic joining device 1.

The ultrasonic joining device 1 comprises an ultrasonic horn 2 and an anvil 3. A gap 4 is configured between the ultrasonic horn 2 and the anvil 3. The paper material 5 to be joined is situated in said gap 4. Two joining partners are shown which overlap within the gap 4. Said two joining partners are bonded to one another by means of the ultrasonic joining device 1.

A joining force acts via the anvil 3 on the paper material 5 in the gap 4. The joining force is oriented in a joining force direction 6.

The ultrasonic horn 2 is induced to carry out an ultrasonic vibration in the direction of vibration 7. Said direction of vibration 7 corresponds to the direction of extension of the amplitudes of the ultrasonic vibration.

As can be clearly seen in FIG. 1, the joining force direction 6 is perpendicular (also: at a right angle) to the direction of vibration 7. In so doing, the process used here relates to an ultrasonic frictional welding method.

Figure 2:
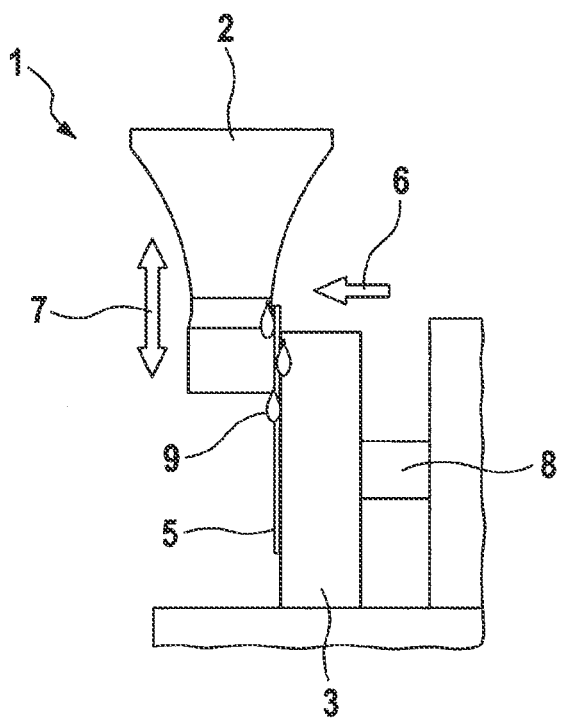
FIG. 2 shows a detailed view with regard to FIG. 1.

FIG. 2 shows a detailed view with regard to FIG. 1, likewise schematically simplified. According to FIG. 2, the anvil 3 is impinged via a cylinder rod 8; thus enabling the anvil 3 to exert the joining force on the paper material 5 in the gap 4. The cylinder rod 8 is thus also disposed parallel to the joining force direction 6.

In a schematic view that is greatly simplified, FIG. 2 furthermore shows the option of moistening the paper material 5 with water. As described earlier, the moistening of the paper material 5 promotes the joining process.

Figure 3:
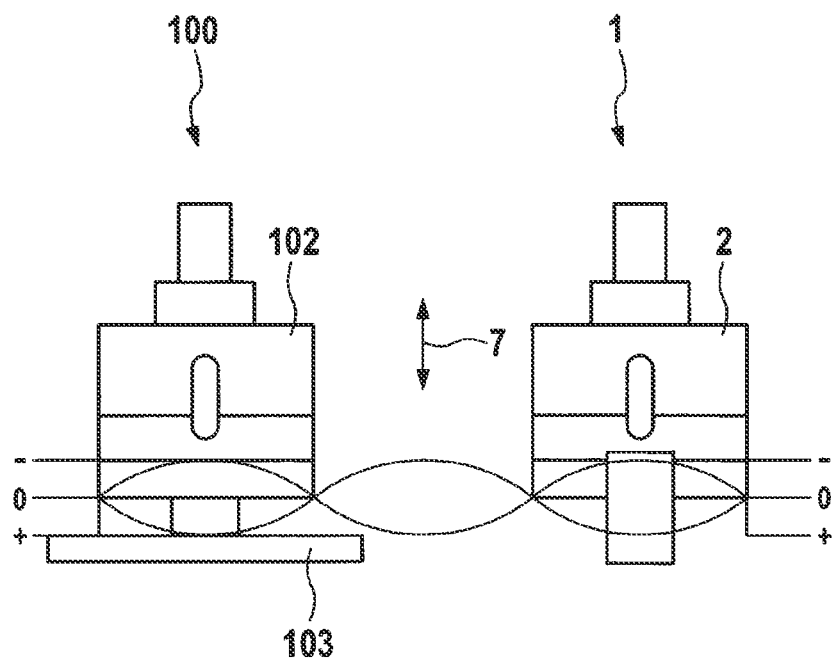
FIG. 3 shows a comparison of a conventional ultrasonic joining method with the inventive ultrasonic joining method in juxtaposition.
Figure 6:
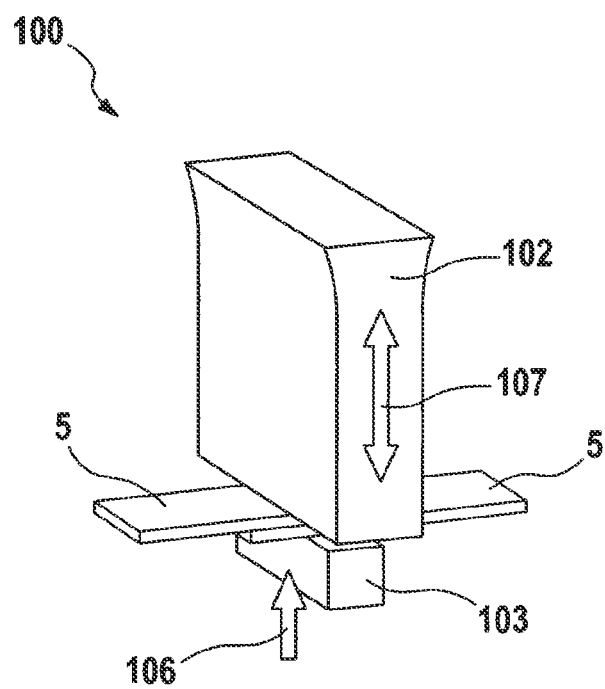
FIG. 6 shows an ultrasonic joining device according to the prior art.

On the left side, FIG. 3 shows the principle of the conventional longitudinal ultrasonic welding, as said welding is carried out, for example, with the device 100 according to the prior art in FIG. 6. The amplitude of the ultrasonic vibration is not depicted true to scale in order to clarify the functional principle. The amplitude is, for example, between 20 and 40 µm. On the right side in FIG. 3, the principle of the ultrasonic joining device 1 according to the invention is depicted. It can be seen in this depiction that only the lower, positive amplitude in the direction of the paper material 5 can have an effect when carrying out the method according to the prior art. In contrast according to the inventive principle of ultrasonic frictional welding, a lateral contact pressure of the paper material 5 to the ultrasonic horn occurs, as is shown in FIGS. 1 and 2. As a result, both amplitude directions, i.e. the expansion in the positive amplitude direction and the pulling together or contraction in the negative amplitude direction, can be effectively used for the joining process.

Figure 4:
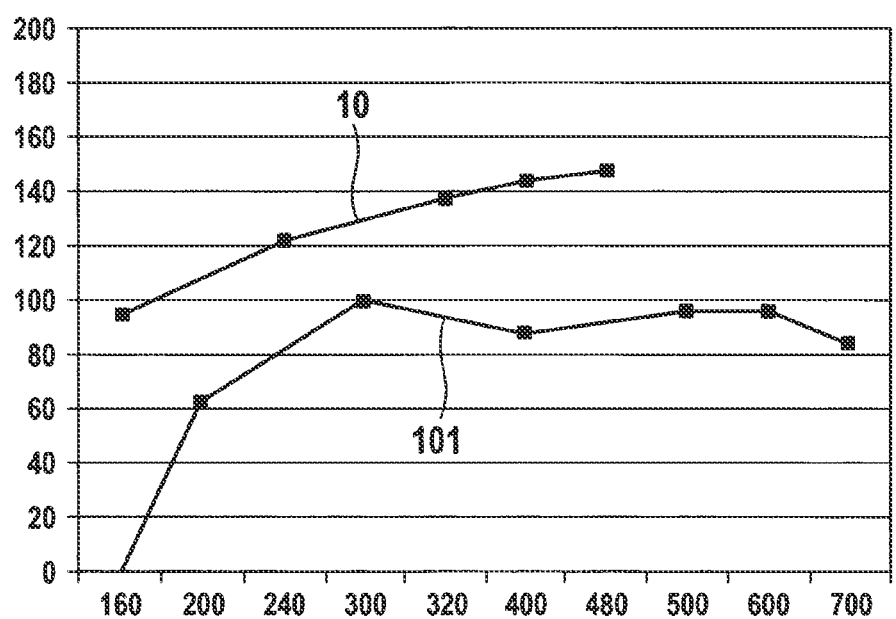
FIG. 4 shows a diagram of the tensile strength of the joining point which has been produced.

The test results are shown in a diagram in FIG. 4 in which a paperboard having a density of 300 g/m² was tested in a device 100 according to the prior art and with an inventive ultrasonic joining device 1 according to the invention. The applied joining force in [N] is plotted on the horizontal axis. The vertical axis shows the generated tensile strength in

[N/15 mm] of the joint. An upper profile 10 shows the result of the inventive ultrasonic joining method. A lower profile 101 shows the result when using the device 100 according to the prior art.

Within the scope of the invention and in experimental trials, it has been show that that paper, paperboard and cardboard can be better bonded to one another if, in accordance with the invention, an ultrasonic frictional welding process is used as the joining process. In contrast to conventional ultrasonic welding, the direction of vibration is thereby not parallel to the joining force direction 6 but preferably perpendicular (also: at a right angle) thereto. The strength values of the bond in terms of shear and peel strength are significantly increased in comparison to the longitudinal ultrasonic welding methods. In addition, as can be seen in FIG. 4, relatively high tensile strengths can also be achieved in the range of low joining forces.

It is assumed on the basis of trials performed that not only micro-splicing of the fibers and new hydrogen bonds are crucial for the bond having relatively high tensile strength. The results support a plasticizing and solidifying of fiber-own polymers, natural or synthetic binding agents as well as polymer-like additives. It can be assumed that plasticized regions are located on the contact surfaces during the joining process. The conventional longitudinal ultrasonic joining process stresses the joining partners with an increased penetration. In order to improve the bonding quality, it is more expedient to allow the mechanical stress to act parallel to the joining plane, as was shown within the scope of the present invention. A further significant advantage, which speaks for a lateral contact pressure of the ultrasonic horn 2 to the paper material 5, is the complete utilization of the vibrations of the ultrasonic horn in both amplitude directions. In the case of ultrasonic welding according to the invention, the expansion as well as the contraction movement is used from the standing wave generated in the oscillatory structure. If the ultrasonic horn is pressed against the joining partner during conventional longitudinal ultrasonic welding, only the expansion has an effect on the welding process. During contraction, the ultrasonic horn 102 loses contact to the paper material 5. In the ultrasonic joining method according to the invention, a doubling of the effective amplitude can therefore be achieved, from, for example, 24 μm to 48 μm at 30 kHz.

Figure 5:
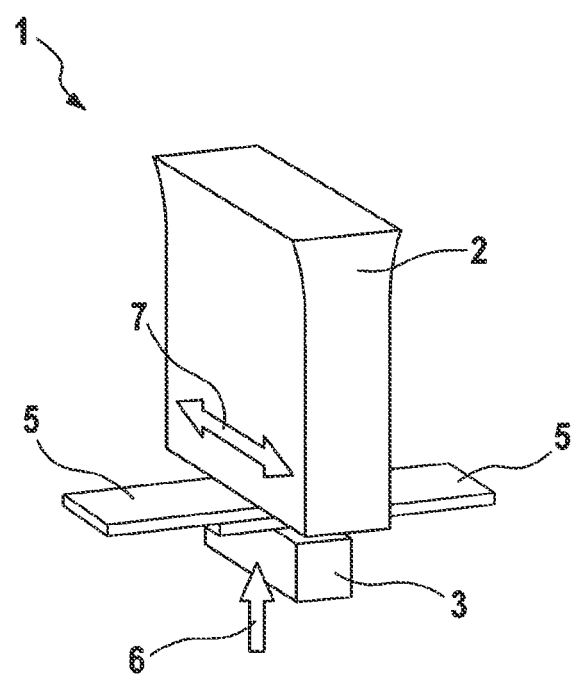
FIG. 5 shows a schematically simplified depiction of the inventive ultrasonic joining device for carrying out the inventive ultrasonic joining method according to a second exemplary embodiment.

FIG. 5 shows an ultrasonic joining device 1 according to the second exemplary embodiment in a view that is very schematically simplified. The inventive ultrasonic joining method can be carried out with this ultrasonic joining device 1. Identical or functionally identical components are provided with the same reference signs in both exemplary embodiments.

In the second exemplary embodiment, the ultrasonic horn 2 swings horizontally and parallel to the joining surfaces. The direction of vibration 7 is consequently also horizontally oriented. The joining force direction 8 is vertically oriented and thus at a right angle to the direction of vibration 7.

What is claimed is:

1. An ultrasonic joining method for bonding paper material (5), comprising the following steps:
    introducing the paper material (5) into a gap (4) between an ultrasonic horn (2) and an anvil (3), wherein the gap (4) is formed between a flat surface of the ultrasonic horn (2) and a flat surface of the anvil (3);
    applying a joining force with the anvil (3) in a joining force direction (6) to the paper material (5) in the gap (4); and
    setting the ultrasonic horn (2) into an ultrasonic vibration in order to join the paper material (5) in an ultrasonic frictional welding operation, in which the joining force direction (6) is not parallel to a direction of vibration (7) of the ultrasonic vibration, and wherein the flat surface of the ultrasonic horn (2) and the flat surface of the anvil (3) are parallel to the direction of vibration (7).

2. The ultrasonic joining method according to claim 1, characterized in that the joining force direction (6) is perpendicular to the direction of vibration (7), with a maximum deviation of ±10°.

3. The ultrasonic joining method according to claim 1, characterized in that an ultrasonic vibration frequency of the ultrasonic horn (2) lies between 10 and 80 kHz.

4. The ultrasonic joining method according to claim 1, characterized in that an ultrasonic vibration amplitude of the ultrasonic horn lies between 10 and 50 μm.

5. The ultrasonic joining method according to claim 1, characterized in that the paper material (5) is moistened prior to and/or during the ultrasonic frictional welding operation.

6. The ultrasonic joining method according to claim 1, characterized in that no adhesive and no thermoplastic resin is used in order to ultrasonically join the paper material (5).

7. A method for producing a packaging from paper material (5), wherein an ultrasonic joining method is used according to claim 1.

8. An ultrasonic joining device (1) for bonding paper material (5), comprising:
    an ultrasonic horn (2) configured to be set into ultrasonic vibration, the ultrasonic horn (2) having a flat surface, and
    an anvil (3) having a flat surface,
    wherein the device is configured such that a joining force acts on the paper material (5) in a joining force direction (6) in a gap (4) between the flat surface of the ultrasonic horn (2) and the flat surface of the anvil (3) as a result of applying a force to at least one of the ultrasonic horn (2) and the anvil (3),
    wherein the ultrasonic joining device (1) is configured to perform an ultrasonic frictional welding operation in which the joining force direction (6) is not parallel to a direction of vibration (7) of the ultrasonic vibration,
    wherein the flat surface of the ultrasonic horn (2) and the flat surface of the anvil (3) are parallel to the direction of vibration (7), and
    wherein the anvil (3) is configured to be moved in a direction of the ultrasonic horn (2) in order to generate the joining force (6).

9. The ultrasonic joining device according to claim 8, characterized in that the joining force direction (6) is perpendicular to a direction of vibration (7) with a deviation of up to ±10°.

10. The ultrasonic joining device according to claim 8, characterized in that the ultrasonic horn (2) is configured to be moved in a direction of the anvil (3).

11. The ultrasonic joining method according to claim 1, characterized in that an ultrasonic vibration frequency of the ultrasonic horn (2) lies between 20 and 70 kHz.

12. The ultrasonic joining method according to claim 1, characterized in that an ultrasonic vibration amplitude of the ultrasonic horn lies between 20 and 40 μm.

13. The ultrasonic joining method according to claim 1, characterized in that the paper material (5) is moistened on inside surfaces of joints prior to and/or during the ultrasonic frictional welding operation.

14. The ultrasonic joining method according to claim 1, characterized in that no adhesive, no thermoplastic resin and no printing ink is used in order to ultrasonically join the paper material (5).

* * * * *